US012436275B2

(12) United States Patent
Youssef et al.

(10) Patent No.: US 12,436,275 B2
(45) Date of Patent: Oct. 7, 2025

(54) ULTRASONIC DEVICE COEXISTENCE

(71) Applicant: InvenSense, Inc., San Jose, CA (US)

(72) Inventors: Joe Youssef, Noyarey (FR); Mitchell Kline, Alameda, CA (US); Richard J. Przybyla, Piedmont, CA (US)

(73) Assignee: InvenSense, Inc., San Jose, CA (US)

( * ) Notice: Subject to any disclaimer, the term of this patent is extended or adjusted under 35 U.S.C. 154(b) by 316 days.

(21) Appl. No.: 18/216,203

(22) Filed: Jun. 29, 2023

(65) Prior Publication Data

US 2024/0004061 A1    Jan. 4, 2024

Related U.S. Application Data

(60) Provisional application No. 63/358,116, filed on Jul. 2, 2022.

(51) Int. Cl.
*G01S 15/00* (2020.01)
*G01S 7/52* (2006.01)
*G01S 15/10* (2006.01)
*G01S 15/87* (2006.01)

(52) U.S. Cl.
CPC ........ *G01S 15/003* (2013.01); *G01S 7/52004* (2013.01); *G01S 15/107* (2013.01); *G01S 15/876* (2013.01)

(58) Field of Classification Search
CPC .... G01S 7/5273; G01S 7/52004; G01S 15/87; G01S 15/107; G01S 15/88; G01S 15/003; G01S 15/876; G01S 15/526; G01S 15/931
See application file for complete search history.

(56) References Cited

U.S. PATENT DOCUMENTS

| | | | |
|---|---|---|---|
| 4,845,682 A * | 7/1989 | Boozer | G01S 15/105 340/552 |
| 10,700,792 B2 | 6/2020 | Przybyla et al. | |
| 10,901,064 B2 | 1/2021 | Przybyla et al. | |
| 2011/0122849 A1* | 5/2011 | Jain | H04W 74/0808 370/336 |

(Continued)

FOREIGN PATENT DOCUMENTS

WO    WO-0245998 A2 *    6/2002    ............. G01S 7/527

*Primary Examiner* — Daniel L Murphy
*Assistant Examiner* — Amie M Ndure
(74) *Attorney, Agent, or Firm* — Morris Patent Law, P.C., L.L.O.

(57) ABSTRACT

A device comprises a processor communicatively coupled with an ultrasonic sensor which is configured to repeatedly emit ultrasonic pulses during transmit periods which are interspersed with receive periods. Returned ultrasonic signals corresponding to the emitted ultrasonic pulses are received by the ultrasonic sensor during the receive periods. The processor is configured to direct the ultrasonic sensor to listen, during a listening window, for a potentially interfering ultrasonic signal from a second ultrasonic sensor. The listening window is prior to a transmit period of the transmit periods. In response to detecting the potentially interfering ultrasonic signal during the listening window, the processor is configured to adjust operation of the ultrasonic sensor to avoid an ultrasonic collision with the second ultrasonic sensor to facilitate coexistence of the ultrasonic sensor and the second ultrasonic sensor in an operating environment shared by the ultrasonic sensor and the second ultrasonic sensor.

23 Claims, 7 Drawing Sheets

(56) References Cited

U.S. PATENT DOCUMENTS

2016/0234696 A1* 8/2016 Looker .................... H04B 1/44
2018/0338326 A1* 11/2018 Sadek ................... H04L 5/0073
2020/0267562 A1* 8/2020 Nam ................... H04L 27/2666

* cited by examiner

600

DIRECT THE ULTRASONIC SENSOR TO LISTEN DURING A LISTENING WINDOW FOR A POTENTIALLY INTERFERING ULTRASONIC SIGNAL FROM A SECOND ULTRASONIC SENSOR, WHEREIN THE ULTRASONIC SENSOR IS CONFIGURED TO REPEATEDLY EMIT ULTRASONIC PULSES DURING TRANSMIT PERIODS WHICH ARE INTERSPERSED WITH RECEIVE PERIODS, WHERE RETURNED ULTRASONIC SIGNALS CORRESPONDING TO THE EMITTED ULTRASONIC PULSES ARE RECEIVED BY THE ULTRASONIC SENSOR DURING THE RECEIVE PERIODS, WHEREIN THE LISTENING WINDOW IS PRIOR TO A TRANSMIT PERIOD OF THE TRANSMIT PERIODS
610

IN RESPONSE TO DETECTION OF AN INTERFERING ULTRASONIC SIGNAL DURING THE LISTENING WINDOW, ADJUST OPERATION OF THE ULTRASONIC SENSOR TO AVOID AN ULTRASONIC COLLISION WITH THE SECOND ULTRASONIC SENSOR TO FACILITATE COEXISTENCE OF THE ULTRASONIC SENSOR AND THE SECOND ULTRASONIC SENSOR IN AN OPERATING ENVIRONMENT SHARED BY THE ULTRASONIC SENSOR AND THE SECOND ULTRASONIC SENSOR
620

IN RESPONSE TO AN ABSENCE OF DETECTION OF ANY INTERFERING ULTRASONIC SIGNALS FOR A PREDETERMINED TIME PERIOD, PROCEEDING WITH THE EMITTING OF THE ULTRASONIC PULSES AND THE RECEIVING OF THE RETURNED ULTRASONIC SIGNALS WITHOUT THE ADJUSTING OF OPERATION
630

MODULATE AN ULTRASONIC PULSE OF THE EMITTED ULTRASONIC PULSES TO PROVIDE INFORMATION FROM THE ULTRASONIC SENSOR TO THE SECOND ULTRASONIC SENSOR ABOUT A SENSING PROTOCOL BEING USED BY THE ULTRASONIC SENSOR
640

FIG. 6B

ULTRASONIC DEVICE COEXISTENCE

REFERENCE TO RELATED APPLICATIONS

This application claims priority to and benefit of U.S. Provisional Patent Application No. 63/358,116, filed on Jul. 2, 2022, entitled ULTRASONIC DEVICE COEXISTENCE," by Joe Youssef, and Mitchell Kline, and Richard Przybyla, and assigned to the assignee of the present application, the disclosure of which is hereby incorporated herein by reference in its entirety.

BACKGROUND

A variety of devices exist which utilize ultrasonic sensing to detect the presence of moving and/or stationary objects in their operating environment. Some non-inclusive examples include personal computers, electronic door locks, and robotic vacuums. Some devices such as personal computers and electronic door locks may be stationary much of the time. Such stationary or mostly non-moving objects may use ultrasonic sensing to detect a potential approaching user in their operating environment so that they may, for example, begin exiting a power saving mode responsive to detecting a potential approaching user. Other devices, such as robotic vacuums or other vehicles, which move about such as on floors or other surfaces may use ultrasonic sensing to detect for moving and/or stationary objects in their operating environment to facilitate avoidance of such detected objects. It should be appreciated that these examples are only a small subset of the devices that may be utilizing ultrasonic signals for sensing in an operating environment such as a building, room, etc. Increasingly, because of this widespread use of ultrasonic sensors, there may be two or more devices emitting ultrasonic signals that may be received both by the emitting devices and by one or more other devices which share the same operating environment.

BRIEF DESCRIPTION OF THE DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIGS. 6A and 6B illustrate a flow diagram of an example method of ultrasonic device coexistence, in accordance with various embodiments.

DETAILED DESCRIPTION

Figure 1A:
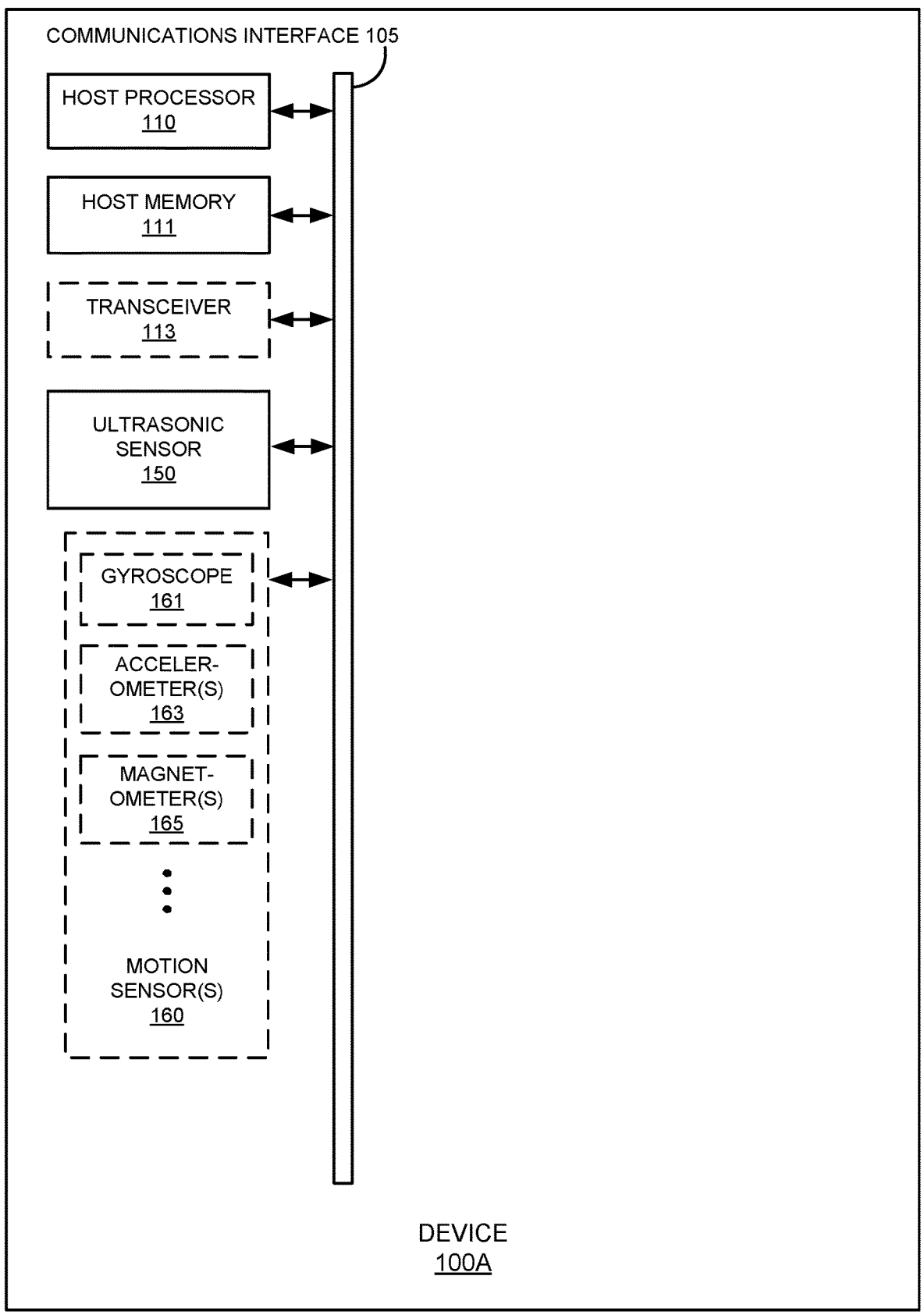
FIGS. 1A and 1B show example block diagrams of some aspects of a device which uses ultrasonic signals to sense objects in its operating environment, in accordance with various embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Overview of Discussion

A variety of devices exist which need to be aware of the objects and/or surfaces in the proximity of their operating environment. Often such devices use sonic sensing, such as via ultrasonic sensors, for detecting proximate objects, detecting proximate surfaces, and/or to support avoiding collisions with detected proximate objects and/or surfaces. The devices may include stationary devices, aerial devices, and surface contact devices.

As described previously, because of the widespread use of ultrasonic sensors, there may be two or more devices emitting ultrasonic signals that may be received both by the emitting device and by one or more other ultrasonic sensing devices which share the same operating environment. For example, a first device may sense signals from a second device and in some situations such as when the two devices operate at similar sensing cycle timing that overlaps transmit and receive periods or else drifts slightly relative to one another, the first device may interpret the received signals from the second device as a moving object—even if both devices are stationary. Such a false detection of a moving object may trigger the first device to take an unnecessary action such as powering tip due to falsely interpreting a user is coming near or is present, or even taking an evasive maneuver due to falsely interpreting a collision with a moving object is imminent.

Conventionally, many devices which use ultrasonic sensors operate the ultrasonic sensors in a free running mode of operation in which the sensor uses its own timing system (e.g., an RC oscillator plus timer) to trigger an ultrasonic measurement (transmission followed by receipt/listening), or sampling, at a periodic rate. Often the timing system may have an error rate of possibly up to a few percent, meaning that in a free-running mode the timing of the sample rate of the ultrasonic measurements may drift slightly over time even though they are intended to be at fixed regular intervals. When two or more ultrasonic sensors (either on the same device or split among multiple devices) use a closely matched operating frequency in such a free running mode, there can be interference and contention when the two or more ultrasonic sensors are within range and field of view of one another, and the sample rates match up (e.g., overlap) or closely match up. This can cause an ultrasonic collision of signals. As an example of an ultrasonic collision of signals (or "ultrasonic collision"), a transmitted ultrasonic transmission or "ping" from a first ultrasonic sensor may be undesirably received by a second ultrasonic sensor, and this large change in the received signal at the second ultrasonic sensor will trip the static target rejection algorithm of the second ultrasonic sensor making the second ultrasonic sensor determine that a moving target is present when none is. U.S. Pat. No. 10,901,064, titled "Ultrasonic Beacon Tracking," describes some techniques for measuring distances between ultrasonic sensors operating in the same environment, but appears to purposely place these sensors in a situation of coexistence and possible contention instead of trying to avoid it.

In general, as the use of ultrasonic sensing becomes more prevalent, the ultrasonic sensing environment will increasingly be polluted with ultrasound that is not following any sort of a coexistence-proof protocol for operating in the presence of other ultrasonic signals with a similar operating frequency and/or timing, and this will result in ultrasonic sensors receiving interference signals that cause a false detection of one or more objects (i.e., an ultrasonic collision). Ultrasonic coexistence means that an ultrasonic sensor and the device with which it is coupled to are able to tolerate an operating environment where there are other ultrasonic signals that exist with a similar operating frequency and/or timing.

Herein, techniques for ultrasonic device coexistence are described which facilitate an ultrasonic sensor to share an environment with one or more others without the occurrence of interference which causes false detection by the ultrasonic sensor and by additionally avoiding causing interference/collisions for one or more other ultrasonic sensors.

Discussion begins with a description of notation and nomenclature. Discussion then shifts to description of some block diagrams of example components of some example devices. Some example devices, in the form of ultrasonic enabled electronic door locks, are depicted in a hallway operating environment. These example devices are discussed, though it is appreciated that a device or devices can take many other forms. Ultrasonic sensing results are depicted to show how coexistence of devices with ultrasonic sensors can be frustrated, when one device senses ultrasonic signals transmitted by another. A high-level flowchart of a technique of ultrasonic device coexistence is described. An example of an ultrasonic sensing cycle modified to facilitate coexistence is depicted and described. Finally, an example method of operating an ultrasonic transducer to facilitate coexistence with other ultrasonic sensors in the operating environment of the ultrasonic transducer is described, in accordance with various embodiments.

Notation and Nomenclature

Some portions of the detailed descriptions which follow are presented in terms of procedures, logic blocks, processes, modules and other symbolic representations of operations on data bits within a computer memory. These descriptions and representations are the means used by those skilled in the data processing arts to most effectively convey the substance of their work to others skilled in the art. In the present application, a procedure, logic block, process, module, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device/component.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "transmitting," "stopping transmitting," "receiving," "detecting," "listening," "directing," "directing an ultrasonic sensor to listen during a listening window," "adjusting," "adjusting operation of an ultrasonic sensor," "adjusting timing," "adjusting a sample rate," "adjusting a listening window period," "delaying," "proceeding," "modulating," "changing an operating frequency," "setting," "setting the center," "changing frequency," "monitoring a listening window," or the like, refer to the actions and processes of an electronic device or component such as: a host processor, a sensor processing unit, a sensor processor, a digital signal processor or other processor, a memory, a sonic sensor (e.g., an ultrasonic sensor/transducer), a device utilizing an ultrasonic sensor/transducer, some combination thereof, or the like. The electronic device/component manipulates and transforms data represented as physical (electronic and/or magnetic) quantities within the registers and memories into other data similarly represented as physical quantities within memories or registers or other such information storage, transmission, processing, or display components.

Embodiments described herein may be discussed in the general context of processor-executable instructions residing on some form of non-transitory processor-readable medium, such as program modules or logic, executed by one or more computers, processors, or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example electronic device(s) described herein may include components other than those shown, including well-known components.

The techniques described herein may be implemented in hardware, or a combination of hardware with firmware and/or software, unless specifically described as being implemented in a specific manner. Any features described as modules or components may also be implemented together in an integrated logic device or separately as discrete but interoperable logic devices. If implemented in software, the techniques may be realized at least in part by a non-transitory computer/processor-readable storage medium comprising computer/processor-readable instructions that, when executed, cause a processor and/or other components of a computer or electronic device to perform one or more of the methods described herein. The non-transitory processor-readable data storage medium may form part of a computer program product, which may include packaging materials.

The non-transitory processor-readable storage medium (also referred to as a non-transitory computer-readable storage medium) may comprise random access memory (RAM) such as synchronous dynamic random access memory (SDRAM), read only memory (ROM), non-volatile random access memory (NVRAM), electrically erasable programmable read-only memory (EEPROM), flash memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a plurality of microprocessors, one or more microprocessors in conjunction with an ASIC or DSP, or any other such configuration or suitable combination of processors.

In various example embodiments discussed herein, a chip is defined to include at least one substrate typically formed from a semiconductor material. A single chip may, for example, be formed from multiple substrates, where the substrates are mechanically bonded to preserve the functionality. Multiple chip (or multi-chip) includes at least two substrates, wherein the two substrates are electrically connected, but do not require mechanical bonding.

A package provides electrical connection between the bond pads on the chip (or for example a multi-chip module) to a metal lead that can be soldered to a printed circuit board (or PCB). A package typically comprises a substrate and a cover. An Integrated Circuit (IC) substrate may refer to a silicon substrate with electrical circuits, typically CMOS circuits but others are possible and anticipated. A MEMS substrate provides mechanical support for the MEMS structure(s). The MEMS structural layer is attached to the MEMS substrate. The MEMS substrate is also referred to as handle substrate or handle wafer. In some embodiments, the handle substrate serves as a cap to the MEMS structure.

Some embodiments may, for example, comprise one or more sonic sensors. This sensor may be any suitable sonic sensor operating in any suitable sonic range. For example, in some embodiments, the sonic sensor may be an ultrasonic sensor which utilizes a MEMs ultrasonic transducer. In some embodiments, the sonic sensor may include digital signal processor (DSP) which may be disposed as a part of an ASIC which may be integrated into the same package as a transducer. One example of such an ultrasonic sensor which may be utilized with various embodiments, without limitation thereto, is the CH101 ultrasonic range sensor and/or the CH201 long-range ultra-low-power integrated MEMS ultrasonic time-of-flight range sensor, both available from Chirp Microsystems, a TDK Group Company, of Berkley, California. The CH101 and the CH201 are only two examples of ultrasonic sensors, other types and/or brands of ultrasonic sensors may be similarly utilized.

Some embodiments may, for example, comprise one or more motion sensors along with one or more ultrasonic sensors. For example, an embodiment with one or more ultrasonic sensors may additionally be coupled with a 9-axis motion sensing device (e.g., an accelerometer, a gyroscope, and a magnetometer or other compass technology, which each provide a measurement along three axes that are orthogonal relative to each other). In another embodiment, one or more ultrasonic sensors may be coupled with a 6-axis motion sensing device (e.g., a three-axis accelerometer and a three-axis gyroscope). Other embodiments may, for example, comprise one or more ultrasonic sensors coupled with motion sensors that form a 10-axis device (e.g., an accelerometer, gyroscope, compass, and pressure sensor). Other embodiments may not include all the sensors or may provide measurements along one or more axes. Some or all of the sensors may be MEMS sensors. Some or all of the sensors may be incorporated in a sensor processing unit along with a sensor processor and disposed in a single semiconductor package.

In some embodiments, for example, one or more sensors may be formed on a first substrate. Various embodiments may, for example, include solid-state sensors and/or any other type of sensors. The electronic circuits in a sensor processing unit may, for example, receive measurement outputs from the one or more sensors. In various embodiments, the electronic circuits process the sensor data. The electronic circuits may, for example, be implemented on a second silicon substrate. In some embodiments, the first substrate may be vertically stacked, attached and electrically connected to the second substrate in a single semiconductor chip, while in other embodiments, the first substrate may be disposed laterally and electrically connected to the second substrate in a single semiconductor package, such as a single integrated circuit.

Example Devices

Figure 1B:
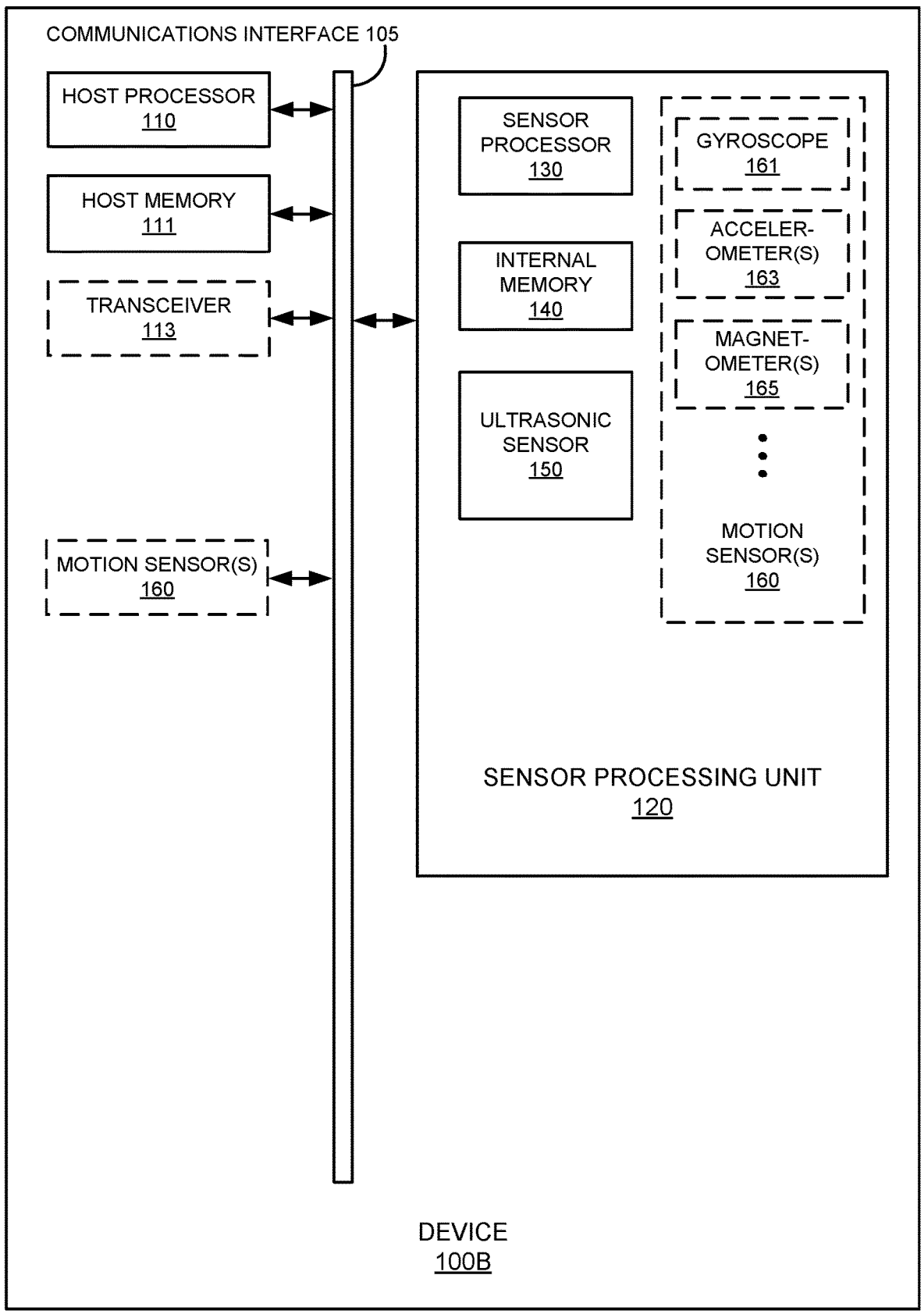

FIGS. 1A and 1B show example block diagrams of some aspects of a device 100 (e.g., 100A and/or 100B) which uses ultrasonic signals to sense objects in its operating environment, in accordance with various embodiments. The sensed objects may be stationary or moving, but a frequent interest is in detecting moving objects in the vicinity of the device 100 so that a responsive action may be taken by the device when a moving object (which may be a user) is detected. Herein, a device 100 may be any device that uses ultrasonic sensing. Some other examples of a device 100 may include, but are not limited to: a television, a computer, an electronic door lock, a remote control vehicle, a telepresence robot, an electric scooter, an electric wheelchair, a wheeled delivery robot, a flying/flyable drone such as a quadcopter drone, a wheeled delivery vehicle, a floor vacuum, a robotic cleaning appliance (which includes: a robotic floor cleaner, a robotic vacuum, or combinations thereof), a security light which sonically detects motion to activate, etc. In an environment with a plurality of devices 100 some of the devices may be the same or different. For example, one device 100 may be a computer, while another device 100 may be robotic vacuum or an electronic door lock.

Attention is directed to FIG. 1A which shows a block diagram of components of an example device 100A which utilizes ultrasonic sensing to detect objects in its vicinity. As shown, example device 100A comprises a communications interface 105, a host processor 110, host memory 111, and at least one ultrasonic sensor 150. In some embodiments, device 100A may additionally include one or more of a transceiver 113, and one or more ultrasonic sensors 150 (an ultrasonic sensor may be an ultrasonic transducer which both transmits and receives). In some embodiments, device 100A may additionally include one or more motion sensors 160. Some embodiments may, for example, include additional sensors used to detect motion, position, user presence, or environmental context in the vicinity of device 100A. Some examples of these additional sensors may include, but are not limited to: infrared sensors, cameras, microphones, and/or global navigation satellite system sensors (i.e., a global positioning system receiver). As depicted in FIG. 1A, included components are communicatively coupled with one another, such as, via communications interface 105.

The host processor 110 may, for example, be configured to perform the various computations and operations involved with the general function of device 100A (e.g., sending commands to move, steer, avoid obstacles, and operate/control the operation of tools). Host processor 110 can be one or more microprocessors, central processing units (CPUs), DSPs, general purpose microprocessors, ASICs, ASIPs, FPGAs or other processors which run software programs or applications, which may be stored in host memory 111, associated with the general and conventional functions and capabilities of device 100A. It should be understood that, in some embodiments, the entire coexistence protocol described extensively with reference to FIGS. 4-6B is managed may be managed by host processor 110. In embodiments, the coexistence protocol may be managed by a microcontroller (e.g., sensor processor 130 or the like of FIG. 1B) embedded inside a sensor/system on a chip (SoC) with minimal or no involvement from host processor 110. Further examples and additional discussion of a SoC architecture which includes a programmable ultrasonic sensor can be found in U.S. Pat. No. 10,700,792, which is titled "Programmable Ultrasonic Transceiver."

Communications interface 105 may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, or other equivalent and may include a plurality of communications interfaces. Communications interface 105 may facilitate communication between SPU 120 and one or more of host processor 110, host memory 111, transceiver 113, ultrasonic sensor 150, motion sensor(s) 160 (when included).

Host memory 111 may comprise programs, modules, applications, or other data for use by host processor 110. In some embodiments, host memory 111 may also hold information that that is received from or provided to sensor processing unit 120 (see e.g., FIG. 1B). Host memory 111 can be any suitable type of memory, including but not limited to electronic memory (e.g., read only memory (ROM), random access memory (RAM), or other electronic memory).

Transceiver 113, when included, may be one or more of a wired or wireless transceiver which facilitates receipt of data at device 100A from an external transmission source and transmission of data from device 100A to an external recipient. One example of an external transmission source/ external recipient may be a base station to which device 100A returns for charging, maintenance, docking, etc. By way of example, and not of limitation, in various embodiments, transceiver 113 comprises one or more of: a cellular transceiver, a wireless local area network transceiver (e.g., a transceiver compliant with one or more Institute of Electrical and Electronics Engineers (IEEE) 802.11 specifications for wireless local area network communication), a wireless personal area network transceiver (e.g., a transceiver compliant with one or more IEEE 802.15 specifications (or the like) for wireless personal area network communication), and a wired a serial transceiver (e.g., a universal serial bus for wired communication).

Ultrasonic sensor 150 is typically a transducer but may include a dedicated ultrasonic transmitter and a separate dedicated ultrasonic receiver. In some embodiments, ultrasonic sensor 150 operates in the ultrasonic frequency range between 40 kHz and 200 kHz. Of course, other ultrasonic ranges are anticipated and usable. Ultrasonic sensor 150 is configured to transmit ultrasonic signals and receive ultrasonic returned signals. Returned signals include those that reflect from moving or stationary objects within the range (referred to herein as the vicinity) of the ultrasonic sensor 150 and thus within the vicinity of a device 100A which includes the ultrasonic sensor 150. It should be appreciated that embodiments may similarly include a sonic transducer which operates in the acoustic sound range, the infrasound, and or the ultrasound range.

Motion sensor(s) 160, when included, may be implemented as MEMS-based motion sensors, including inertial sensors such as a gyroscope 161 or accelerometer 163, or an electromagnetic sensor such as a Hall effect or Lorentz field magnetometer 165. In some embodiments, at least a portion of the motion sensors 160 may also, for example, be based on sensor technology other than MEMS technology (e.g., CMOS technology, etc.). As desired, one or more of the motion sensors 160 may be configured to provide raw data output measured along three orthogonal axes or any equivalent structure.

Attention is directed to FIG. 1B which shows a block diagram of components of an example device 100B which utilizes ultrasonic sensing to detect objects in its vicinity. Device 100B is similar to device 100A except that it includes a sensor processing unit (SPU) 120 in which ultrasonic sensor 150 is disposed. SPU 120, when included, comprises: a sensor processor 130; an internal memory 140; and at least one ultrasonic sensor 150. In some embodiments, SPU 120 may additionally include one or more motion sensors 160 (e.g., gyroscope 161, accelerometer 163, magnetometer 165) and/or one or more other sensors such a light sensor, infrared sensor, GNSS sensor, microphone, etc. In various embodiments, SPU 120 or a portion thereof, such as sensor processor 130, is communicatively coupled with host processor 110, host memory 111, and other components of device 100B through communications interface 105 or other well-known means. SPU 120 may also comprise one or more communications interfaces (not shown) similar to communications interface 105 and used for communications among one or more components within SPU 120.

Sensor processor 130 can be one or more microprocessors, CPUs, DSPs, general purpose microprocessors, ASICs, ASIPs, FPGAs or other processors that run software programs, which may be stored in memory such as internal memory 140 (or elsewhere), associated with the functions of SPU 120. In some embodiments, one or more of the functions described as being performed by sensor processor 130 may be shared with or performed in whole or in part by another processor of a device 100B, such as host processor 110.

Internal memory 140 can be any suitable type of memory, including but not limited to electronic memory (e.g., read only memory (ROM), random access memory (RAM), or other electronic memory). Internal memory 140 may store algorithms, routines, or other instructions for instructing sensor processor 130 on the processing of data output by one or more of the motion sensors 160 and/or one or more ultrasonic sensors 150. In some embodiments, internal memory 140 may store one or more modules which may be algorithms that execute on sensor processor 130 to perform a specific function. Some examples of modules may include, but are not limited to: statistical processing modules, motion processing modules, filtering modules, state detection modules, and/or decision-making modules.

Ultrasonic sensor 150 is typically a transducer but may include a dedicated ultrasonic transmitter and a separate dedicated ultrasonic receiver. In some embodiments, ultrasonic sensor 150 operates in the ultrasonic frequency range between 40 kHz and 200 kHz. Of course, other ultrasonic ranges are anticipated and usable. Ultrasonic sensor 150, in an ultrasonic transducer embodiment, is configured to transmit ultrasonic signals and receive ultrasonic returned signals. Returned signals include those that reflect from moving or stationary objects within the range (referred to herein as the vicinity) of the ultrasonic sensor 150 and thus within the vicinity of a device 100B which includes the ultrasonic sensor 150. It should be appreciated that embodiments may similarly include a sonic transducer which operates in the acoustic sound range, the infrasound, and or the ultrasound range.

In some embodiments, ultrasonic sensor 150 is an ultrasonic transducer, such as a PMUT (piezoelectric micromachined ultrasonic transducer). An ultrasonic sensor 150 may be large or small, depending on the application and the space available. In some embodiments, ultrasonic sensor 150 may be a MEMS device and may be very small, such as having a facing surface of less than 4 mm by 4 mm by 1.5 mm. In some embodiments, ultrasonic sensor 150 may be a SOC (system on a chip) which includes a DSP. In some embodiments, the SOC packaging of ultrasonic sensor 150 comprises sensor processing unit 120 and includes sensor processor 130 and internal memory 140.

Motion sensor(s) 160, when included, may be implemented as MEMS-based motion sensors, including inertial sensors such as a gyroscope 161 or accelerometer 163, or an electromagnetic sensor such as a Hall effect or Lorentz field magnetometer 165. In some embodiments, at least a portion of the motion sensors 160 may also, for example, be based on sensor technology other than MEMS technology (e.g., CMOS technology, etc.). As desired, one or more of the motion sensors 160 may be configured to provide raw data output measured along three orthogonal axes or any equivalent structure.

Example of Device(s) Using Ultrasonic Sensing

Figure 2A:
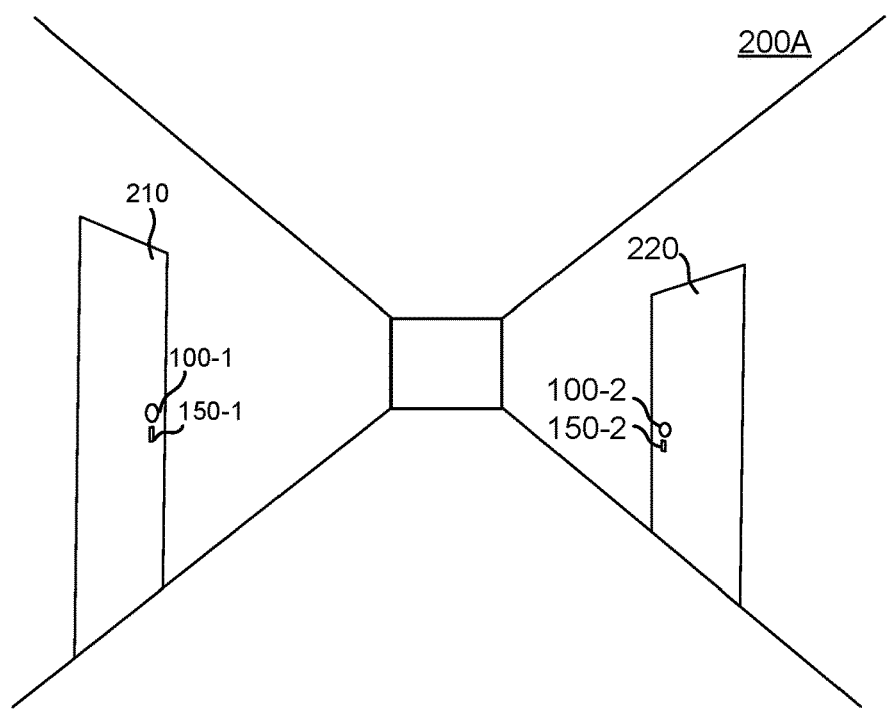
FIG. 2A shows perspective view of an operating environment in which a first electronic door lock is using ultrasonic sensing to detect for the presence of potential users approaching and in which a second electronic door lock is also using ultrasonic sensing to detect for the presence of potential users approaching, in accordance with various embodiments.

FIG. 2A shows perspective view of an operating environment 200A in which a first electronic door lock 100-1 is using ultrasonic sensing to detect for the presence of potential users approaching and in which a second electronic door lock 100-2 is also using ultrasonic sensing to detect for the presence of potential users approaching, in accordance with various embodiments. In FIG. 2A, operating environment 200A is a hallway, such as in an office building or apartment building, with a plurality of doors (doors 210 and 220). A first device 100 (e.g., a device such as 100A or 100B) in the form of electronic door lock 100-1 is coupled with a first door 210 while a second device 100 (e.g., a device such as 100A or 100B) in the form of a second electronic door lock 100-2 is coupled with door 220. Electronic lock 100-1 is depicted as employing an ultrasonic sensor 150-1 to detect, using ultrasonic sensing, for the presence of potential users walking toward door 210. Similarly, electronic lock 100-2 is depicted as employing an ultrasonic sensor 150-2 to detect, using ultrasonic sensing, for the presence of potential users walking toward computer door 220.

In operating environment 200A, ultrasonic sensor 150-2 may be receiving ultrasonic signals transmitted by ultrasonic sensor 150-1. Similarly, ultrasonic sensor 150-1 may be receiving ultrasonic signals transmitted by ultrasonic sensor 150-2. In either case, ultrasonic collisions may frequently occur if one or both of devices 100-1 and 100-2 are operating in a free running mode and/or if a racing condition occurs between their respective ultrasonic sensors (150-1, 150-2).

Figure 2B:
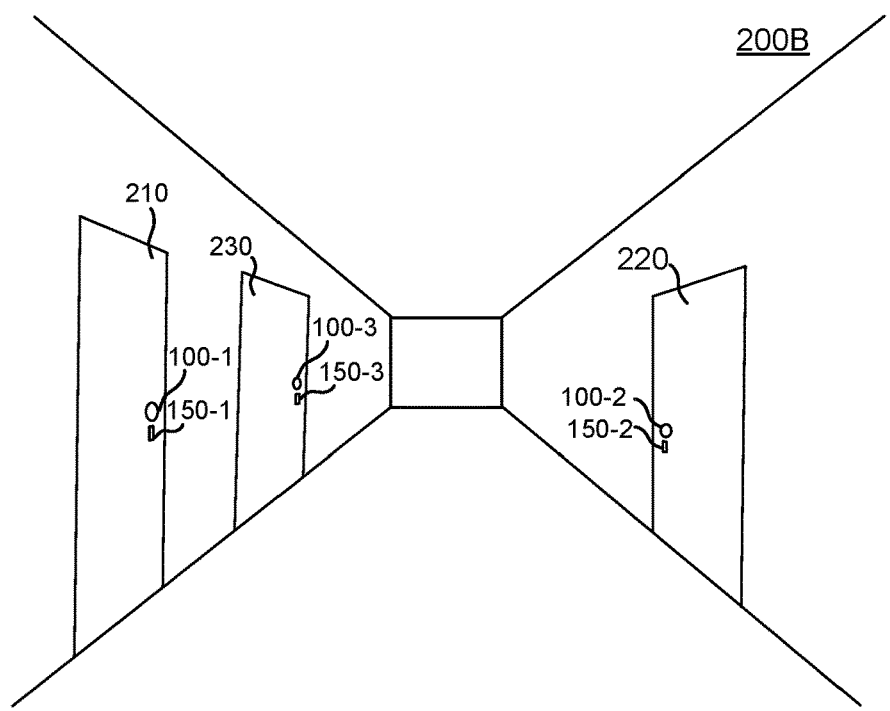
FIG. 2B shows perspective view of an operating environment in which a first electronic door lock is using ultrasonic sensing to detect for the presence of potential users approaching, a second electronic door lock is using ultrasonic sensing to detect for the presence of potential users approaching, a third electronic door lock is using ultrasonic sensing to detect for the presence of potential users approaching in accordance with various embodiments.

FIG. 2B shows perspective view of an operating environment 200B in which a first electronic door lock 100-1 is using ultrasonic sensing to detect for the presence of potential users approaching, a second electronic door lock 100-2 is also using ultrasonic sensing to detect for the presence of potential users approaching, and a third electronic door lock 100-3 is also using ultrasonic sensing to detect for the presence of potential users approaching, in accordance with various embodiments. In FIG. 2B, operating environment 200B is a hallway, such as in an office building or apartment building, with a plurality of doors (doors 210, 220, and 230). A first device 100 (e.g., a device such as 100A or 100B) in the form of electronic door lock 100-1 is coupled with a first door 210, a second device 100 (e.g., a device such as 100A or 100B) in the form of a second electronic door lock 100-2 is coupled with door 220, and a third device 100 (e.g., a device such as 100A or 100B) in the form of a third electronic door lock 100-3 is coupled with door 230. Electronic lock 100-1 is depicted as employing an ultrasonic sensor 150-1 to detect, using ultrasonic sensing, for the presence of potential users walking toward door 210. Similarly, electronic lock 100-2 is depicted as employing an ultrasonic sensor 150-2 to detect, using ultrasonic sensing, for the presence of potential users walking toward computer door 220. Likewise, electronic lock 100-3 is depicted as employing an ultrasonic sensor 150-3 to detect, using ultrasonic sensing, for the presence of potential users walking toward computer door 230.

In operating environment 200B, ultrasonic sensor 150-2 may be receiving ultrasonic signals transmitted by ultrasonic sensor 150-1. Similarly, ultrasonic sensor 150-1 may be receiving ultrasonic signals transmitted by ultrasonic sensor 150-2. In operating environment 2003, ultrasonic sensor 150-3 may be receiving ultrasonic signals transmitted by ultrasonic sensor 150-2. Similarly, ultrasonic sensor 150-2 may be receiving ultrasonic signals transmitted by ultrasonic sensor 150-1. In any of these cases, ultrasonic collisions may frequently occur if one or more of devices 100-1, 100-2, and 100-3 are operating in a free running mode and/or if a racing condition occurs between their respective ultrasonic sensors (150-1, 150-2, 150-3).

Although operating environments 200A and 200B illustrate electronic door locks, it should be appreciated that similar situations could occur with a variety of devices 100 which utilize ultrasonic sensing in the same operating environment. For example, if a robotic cleaning device navigated down the hallway depicted in FIG. 2A or FIG. 2B, it might cause or experience ultrasonic collisions with the ultrasonic sensors 150 coupled with the electronic door locks on the doors.

Figure 3:
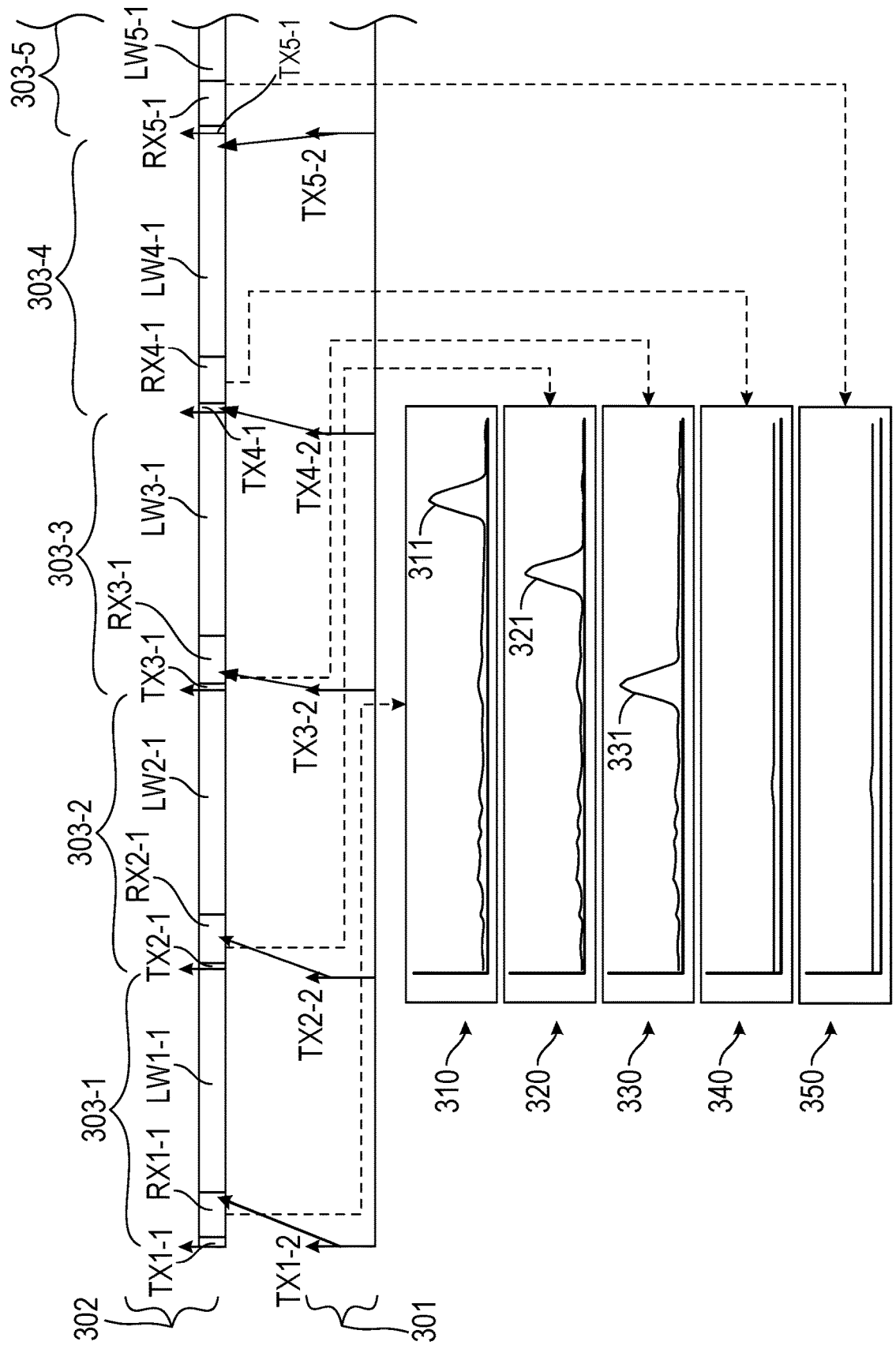
FIG. 3 illustrates an example transmit/receive timing diagram for a first ultrasonic sensor, a transmission timing diagram for a second ultrasonic sensor, and several corresponding measurement diagrams showing ultrasonic signals transmitted by the second ultrasonic sensor and received by the first ultrasonic sensor in a sensing environment, in accordance with various embodiments.

FIG. 3 illustrates an example transmit/receive timing diagram 302 for an ultrasonic sensor 150-2 of device 100-2, a transmission diagram for a second ultrasonic sensor 150-1 of device 100-1, and several corresponding measurement diagrams (310, 320, 330, and 350) showing ultrasonic signals transmitted by the second ultrasonic sensor 150-1 and received by ultrasonic sensor 150-1 in sensing environment 200A (as depicted in FIG. 2A), in accordance with various embodiments.

Timing diagram 302, associated with ultrasonic sensor 150-2, shows five sensing cycles (303-1, 303-2, 303-3, 303-4, and 303-5) at a fixed rate. In one example embodiment, the sensing is performed in environment 200A of FIG. 2A. Each sensing cycle includes a transmit period TX during which an ultrasonic pulse (represented by a corresponding upward directed arrow) is transmitted, a receive period RX during which the ultrasonic transducer (e.g., ultrasonic sensor 150-2) receives ultrasonic signals, and a listening window LW. As illustrated, transmit periods are interspersed with receive periods which follow their respective transmit periods. Conventionally, the depicted listening windows are times when an ultrasonic sensor is waiting to start the next sensing cycle and may be turned off (i.e., not receiving signals). However, in accordance with the techniques described herein, the listening window is used to listen for ultrasonic signals which are not associated with ultrasonic sensor 150-2 (i.e., are not corresponding returned ultrasonic signals of ultrasonic sensor 150-2). Absent use of techniques for ultrasonic coexistence described herein, the sensing cycles are typically at a fixed and repeated length which may vary slightly based on a drift in timing but is otherwise uniform. Within a sensing cycle 303, the receive period RX and the wait period together form a period where ultrasonic sensor 150-2 is receiving rather than transmitting. Sensing cycle 303-1 comprises transmit period TX1-1, receive period RX1-1, and listening window LW1-1. Sensing cycle 303-2 comprises transmit period TX2-1, receive period RX2-1, and listening window LW2-1. Sensing cycle 303-3 comprises transmit period TX3-1, receive period RX3-1, and listening window LW3-1. Sensing cycle 303-4 comprises transmit period TX4-1, receive period RX4-1, and listening window LW4-1. Sensing cycle 303-5 comprises transmit period TX5-1, receive period RX5-1, and listening window LW5-1.

A timing diagram 301 for the transmissions from ultrasonic sensor 150-1 is also provided in FIG. 3. The sensing cycles in timing diagram 301 are not labeled, however they are fixed in length and similar in frequency to the cycles 303-1, 303-2, 303-3, 303-4, and 303-5 of ultrasonic sensor 150-2. A problem which conventionally frustrates coexistence is that they are drifting slightly earlier in time, as shown by the slight leftward drift of the TX arrows in timing diagram 301 relative to the sensing cycles 303 of timing diagram 302. This drift is an example of racing.

Ultrasonic signals received during the receive periods and the listening windows of timing diagram 301 are depicted in signal diagrams 310, 320, 330, 340, and 350. With reference to FIG. 3 and to FIG. 2A as the transmitted ultrasonic signals (TX1-2, TX2-2, TX3-2, TX4-2, and TX5-2) from sensor 150-1 drift earlier in time (as depicted by the leftward shift) relative to the sensing cycles (303-1, 303-2, 303-3, 303-4, and 303-5) and receive periods (RX1-1, RX2-1, RX3-1, RX4-1, and RX5-1) of ultrasonic sensor 150-2. Note, there is no peak in sensing cycle 303-4 or displayed on signal diagram 340 as TX4-2 reaches ultrasonic sensor 150-2 while it is transmitting during TX4-1. Similarly, there is no peak in sensing cycle 303-5 or displayed on signal diagram 350 as TX5-2 reaches ultrasonic sensor 150-2 while it is in a listening window—thus, while the signal is "received" it is not received during RX5-1. However, the receipt of ultrasonic signals from transmissions signals TX1-2, TX2-2, and TX3-2 result in a series of amplitude peaks (311, 321, and 331) which are similar in amplitude to one another but occur progressively earlier in the sequential sensing cycles (303-1, 303-2, and 303-3) for ultrasonic sensor 150-2. This type of progression is called "racing" and can trigger a false detection of a moving/approaching object. Racing in this fashion is a problem conventional sensing techniques face when multiple ultrasonic sensors operate in a shared operating environment and interfere with each other to cause false sensing of static or moving objects that are not present and/or interfere with the sensing of stationary or moving objects that are present.

Figure 4:
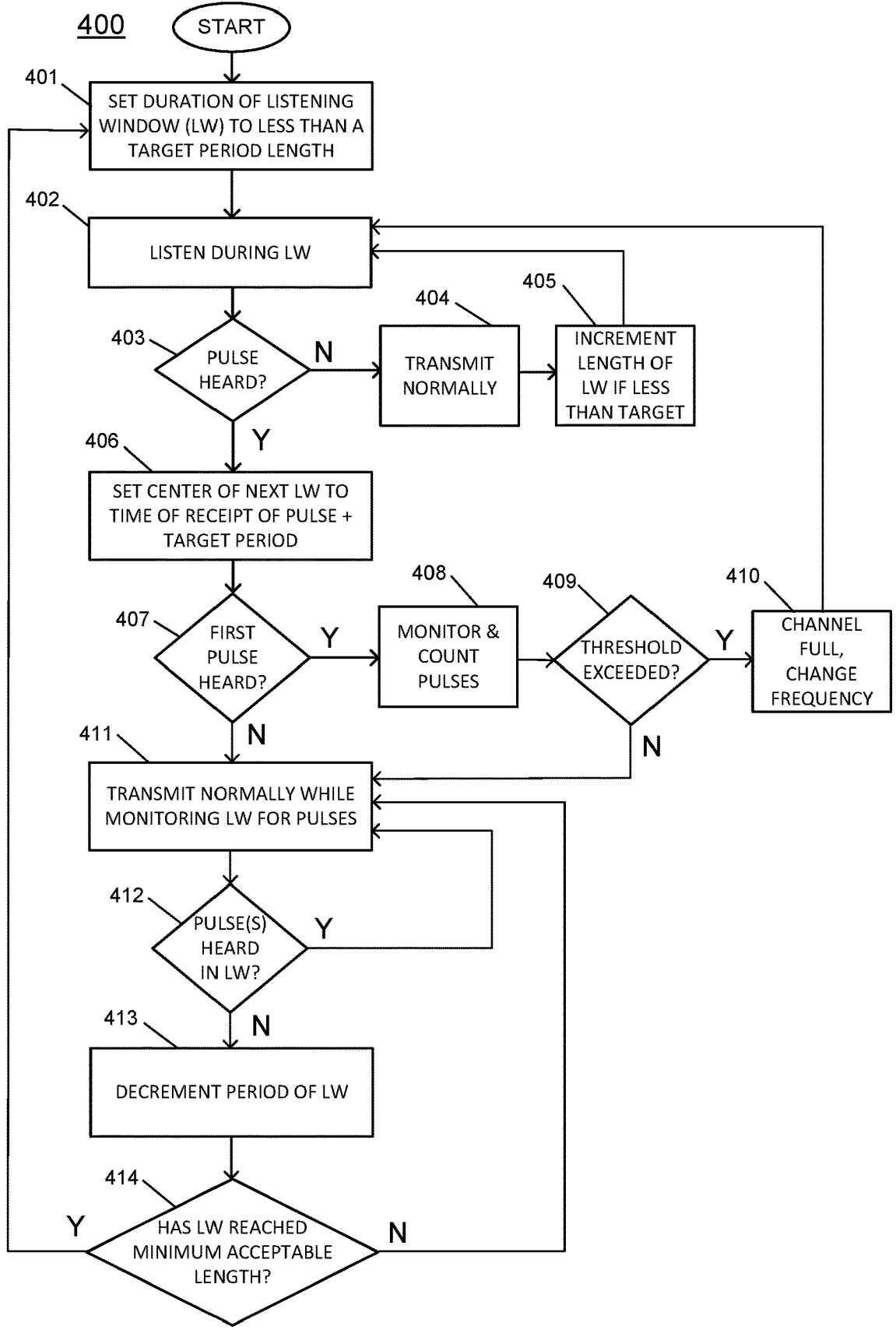
FIG. 4 illustrates an example flowchart of some example procedures in a method of ultrasonic device coexistence, in accordance with various embodiments.

FIG. 4 illustrates an example flowchart 400 of some example procedures in a method of ultrasonic device coexistence, in accordance with various embodiments. At the start of the flowchart, a target period for the length of a listening window is established. It may be set so that it is the standard length of the traditional wait period that would occur after receiving and before the next transmission cycle of an ultrasonic sensor, such as ultrasonic sensor 150-2. In other embodiments, it may be set to be the same length as the receiving period of the ultrasonic sensor. In yet other embodiments it is set for a predetermined amount of time that may be selected for any other suitable reason. For example, in one embodiment, a target length for a listening window may be a 30 ms window, a 40 ms window, a 50 ms window, etc.

At 401, a current period of the listening window is set for a value that is less that the length of the target period. This "current period" may be adjusted to be shorter or longer based on conditions. For example, in one embodiment, the current period=(target period−10 ms); thus, in an example where the target period is 40 ms the current period will be set to 30 ms. The subtracted amount may be different, such as a 15 ms or 12 ns, or a percentage of the target period such as one fourth or one half of the target period. The flow chart then moves on to procedure 402.

At 402, listening takes place during a listening window and the flow chart moves on to procedure 403.

At 403, based on the listening, it is determined if an ultrasonic pulse has been received or "heard" by the ultrasonic sensor. If the answer is "Yes," then the flowchart proceeds to procedure 406, recognizing this is an ultrasonic signal that is from something else in the operating environment and not from the ultrasonic sensor that is accomplishing the procedures in flowchart 400. If the answer is "No," then the flowchart moves on to procedure 404.

At 404, the ultrasonic sensor transmits normally in its next sensing cycle after the end of the current listening period and the flowchart moves on to procedure 405.

At 405 the current length of the listening period is incremented/lengthened in time (e.g., by some predetermined time such as 0.5 ms, 1 ms, 2 ms, or some other increment) if it is still less that the target listening period, and then the flowchart moves back to 402 after transmission and receipt to again listen in the next listening window. This loop continues unless and until a pulse is heard at 403. The incrementing expands the listening window to enhance the ability and amount of time available to search for other ultrasonic pulses in the operating environment of the ultrasonic sensor which might cause an ultrasonic collision.

At 406, if an ultrasonic pulse has been "heard" at 403, the flowchart sets the center of the next listening window to the time of receipt of the pulse+the target period. In this fashion, and because of this indexing or "centering delay," the next pulse if the original pulse is recurring, should recur somewhere within or near the center of the next listening window. The flowchart then moves to procedure 407.

At 407, it is determined if this is the first pulse that has been heard. For example, the first pulse since a reset, the first pulse ever heard during operation, etc. If the answer is "Yes," the flowchart moves to procedure 408. If the answer is "No," the flowchart moves to procedure 411.

At 408, after a first ultrasonic pulse is a monitoring period occurs where the ultrasonic sensor only listens for additional pulses. The monitoring period may be for a time equivalent to a predetermined number of standard sensing cycles of the ultrasonic sensor (e.g., 20), or for a predetermined time period (e.g., 1 second, 3 seconds, 5 second, 7 seconds, etc.). During the monitoring period the ultrasonic sensor does not transmit, it instead only receives. During the monitoring period, received ultrasonic pulses are counted. After the monitoring period, the flowchart moves on to procedure 409.

At 409, it is determined if the counted pulses (if any) exceeded a preset threshold. The threshold may be a total number of counted pulses (e.g., 20, 50, 70, etc.) or may be a number of pulses in a time period or number of listening windows, (e.g., 5 in a second, 7 in a second, 12 in a second). If the answer is "Yes," the flowchart moves on to procedure 410. If the answer is "No," the flowchart moves on to procedure 411.

At 410, when the number of counted pulses has exceeded a predetermined threshold during a monitoring period, then the channel (i.e., the frequency) on which the ultrasonic sensor transmits is deemed to be "full" of other transmissions. The channel is then changed by a predetermined amount (e.g., up by 4 kHz, up by 5 kHz, down by 3 kHz, down by 4 kHz, etc.). After the channel is changed, the flowchart moves back to procedure 402 and the ultrasonic sensor starts sensing again. In some embodiments, instead of changing channels or frequencies, the overall measurement rate may be shortened such as by lengthening one or more of the transmit periods or receive periods in sensing cycles. Such changes in frequency/channel and/or measurement rate may be reverted when interference has been deemed to decrease below the threshold (or below a different threshold) or cease.

At 411, when the number of counted pulses has not exceeded a predetermined threshold during a monitoring period or this isn't the first time a pulse has been heard, the ultrasonic sensor is allowed to transmit and receive normally while continuing to monitor during the listening window for other ultrasonic pulses. The sensing may start with a timing that would be selected to place a recurring pulse somewhere in the listening window of the first sensing cycle occurring as part of procedure 411. In some embodiments, this centering has already been accomplished as part of procedure 406. After a sensing cycle which includes a listening window has been completed, the flowchart moves on to procedure 411.

At procedure 412, it is determined whether any pulse(s) has/have been heard during the listening window. If the answer is "Yes," then then the listening window has been properly positioned to: A) prevent the recurring pulse(s) from occurring during a receive period of the ultrasonic sensor; and B) the transmit period of the ultrasonic sensor has very likely been positioned so that it does not interfere with a receive period of another ultrasonic sensor that is transmitting the pulse(s) being received during the listening window. In essence, ultrasonic coexistence has been achieved and the flowchart loops back to 411 to continue transmitting, receiving, and listening without adjustment. If the answer is "No," the flowchart moves to procedure 413.

At 413, the current time period of the listening window is decremented/shortened by some predetermined amount of time (e.g., shortened by 0.5 ms, 1 ms, 2 ms, 3 ms, or some other predetermined increment) and then the flowchart moves on to procedure 414.

At 414, it is determined whether the listening window has reached a minimum acceptable length. The minimum acceptable length is a predetermined time period (e.g., 30 ms, 25 ms, 20 ms, etc.) or a predetermined portion of the target time period (e.g., less than 50% of the target time period, less than 40% of the target time period, less than 30% of the target time period, etc.). If the answer is "Yes," then the flowchart loops back to procedure 401 and the current value of the listening period is reset in the manner previously described. If the answer is "No," then the flowchart loops back to 411 and sensing continues as normal with the decremented current value of the listening window. The act of decrementing attempts to move a recurring pulse into the listening window if it may have raced into the receive period of the ultrasonic sensor. At 411 ultrasonic sensing proceeds in the manner previously described.

Figure 5:
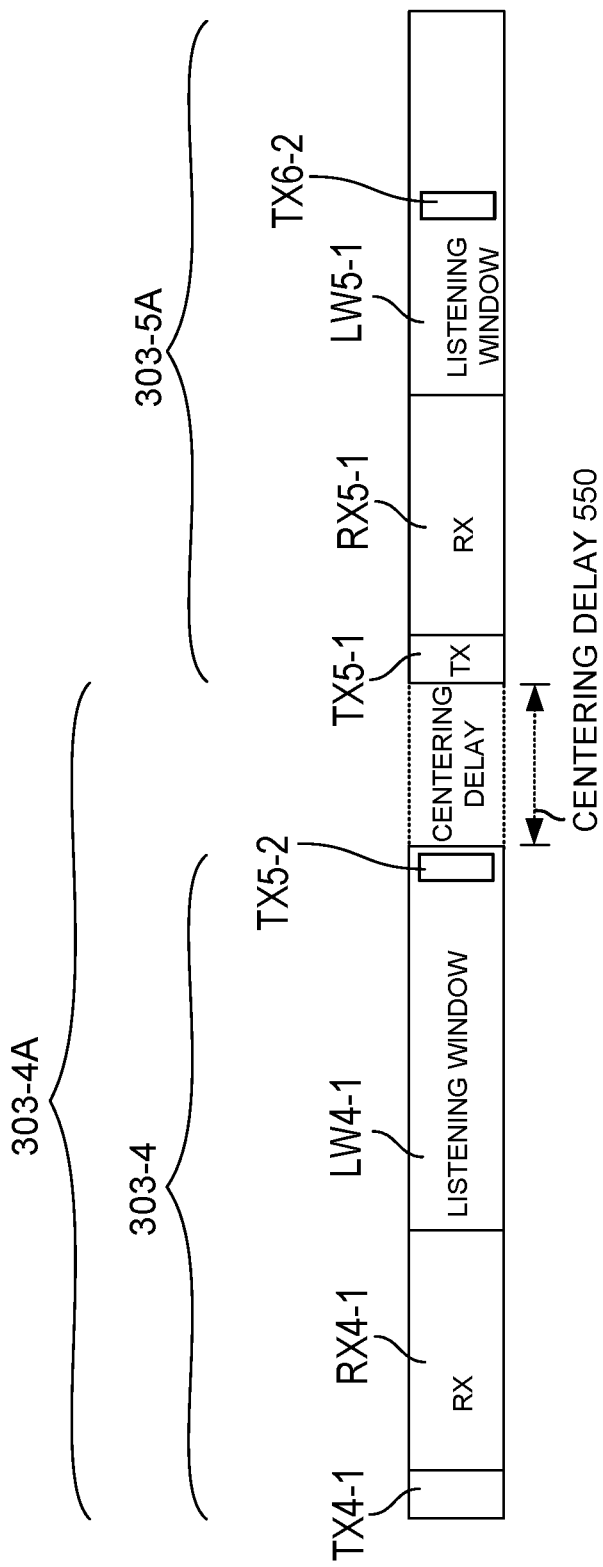
FIG. 5 illustrates portions of some sensing cycles of an ultrasonic transducer in accordance with various embodiments.

FIG. 5 illustrates portions of some sensing cycles, 303-4, 303-4A and 303-5A of an ultrasonic transducer such as ultrasonic sensor 150-2, in accordance with various embodiments. Sensing cycle 303-4 is the same as illustrated in FIG. 3, having a transmit period TX4-1, a receive period RX4-1 and a listening window LW4-1. In one embodiment, sensing cycle 303-4 is operating as a portion of a method of ultrasonic coexistence (e.g., at procedures 402 and 403 of flowchart 400). When ultrasonic pulse from TX5-2 is received (and is not a first pulse heard), a centering procedure occurs as has been described at procedure 406 and a centering delay 550 is added after the end of the listening window LW4-1 and before the next transmission at TX5-1. This effectively lengthens listening window LW4-1 by the amount of the centering delay and likewise changes sensing cycle 303-4 to sensing cycle 303-4A. Sensing cycle 303-5A occurs as part of procedures 406 and 407 of flowchart 400 and in listening window LW5-1 another pulse is heard due to receipt of at transmission TX6-2 from ultrasonic sensor 150-1. Sensing cycle 303-5A differs from sensing cycle 303-5 in that it has been delayed in time. This delay keeps the racing transmission signals from ultrasonic sensor 150-1 in the listening window by tracking it by using the procedures of shortening and lengthening the listening window as described in the procedures of flowchart 400.

With reference to FIG. 2B, FIG. 4, and FIG. 5, it should be appreciated that although the method of ultrasonic coexistence has been described with respect to two ultrasonic sensors (150-1 and 150-2) it can similarly be accomplished with, by, and among many. For example, in a case where device 100-3 and ultrasonic sensor 150-3 are being interfered with by ultrasonic signals from ultrasonic sensor 150-2, ultrasonic sensor 150-3 may implement a method of ultrasonic coexistence (as described in FIG. 4) so that it avoids having collisions caused by transmissions from ultrasonic sensor 150-2 or causing collisions for ultrasonic sensor 150-2 by its transmissions.

In some embodiments, before or after an ultrasonic sensor has achieved a sensing cycle which facilitates ultrasonic coexistence, it may modulate its transmitted ultrasonic signal with information about the timing of transmission and receiving in its sensing cycle. Another ultrasonic sensor (e.g., ultrasonic sensor 150-3) or device (e.g., device 100-3) may receive and demodulate this information and then structure its sensing cycle in a manner that avoids a collision from a transmission from ultrasonic sensor 150-2 and/or avoids transmitting during a time that will likely be received during a receive period of ultrasonic sensor 150-2. Such adjustments by ultrasonic sensor 150-3 facilitate or further facilitate ultrasonic coexistence of devices operating in a shared operating environment, such as operating environment 200B.

Example Methods of Operation

FIGS. 6A and 6B illustrate a flow diagram 600 of an example method of ultrasonic device coexistence, in accordance with various embodiments. By avoiding contention and interference through use of the described techniques, multiple ultrasonic sensors using the same or similar sensing frequencies (frequencies that would normally cause interference with each other) can coexist within a shared sensing environment (e.g., 200A, 200B, etc.) by reducing or eliminating cases of interference, especially those that result in false positive cases of sensing a moving object. Procedures of these example methods will be described with reference to elements and/or components of one or more of FIGS. 1A-5. It is appreciated that in some embodiments, the procedures may be performed in a different order than described, that some of the described procedures may not be performed, and/or that one or more additional procedures to those described may be performed. Flow diagram 600 includes some procedures that, in various embodiments, are or may be carried out by one or more processors (e.g., host processor 110, sensor processor 130, or the like) under the control of computer-readable and computer-executable instructions that are stored on non-transitory computer-readable storage media (e.g., host memory 111, internal memory 140, or the like). It is further appreciated that one or more procedures described in flow diagram 600 and/or may be implemented in hardware, or a combination of hardware with firmware and/or software.

With reference to FIG. 6A, at procedure 610 of flow diagram 600, in various embodiments, an ultrasonic sensor 150 (e.g. 150-2 of FIGS. 2A and 2B) the ultrasonic sensor listens, during a listening window for a potentially interfering ultrasonic signal from a second ultrasonic sensor. The ultrasonic sensor is configured to repeatedly emit ultrasonic pulses during transmit periods which are interspersed with receive periods, where returned ultrasonic signals corresponding to the emitted ultrasonic pulses are received by the ultrasonic sensor during the receive periods, and wherein the listening window is prior to a transmit period of the transmit periods. In some embodiments, the listening window occurs between the receive period of one sensing cycle and the transmit period of the next sequential sensing cycle of an ultrasonic sensor (e.g., ultrasonic sensor 150-2). In this fashion, the listening window may be an extension of the receive period in some embodiments or separate and in addition to a receive period of a sensing cycle (e.g., a sensing cycle 303). Some examples of listening windows (LW4-1 for example) are illustrated in FIGS. 3 and 5. In some embodiments, the ultrasonic sensor is part of a device 100 and/or a sensor processing unit 120 of a device 100 and the listening at procedure 610 is directed by a processor such as host processor 110 or sensor processor 130.

With continued reference to FIG. 6A, at procedure 620 of flow diagram 600, in various embodiments, operation of the ultrasonic sensor is adjusted to avoid an ultrasonic collision with the second ultrasonic sensor to facilitate coexistence of the ultrasonic sensor and the second ultrasonic sensor in an operating environment shared by the ultrasonic sensor and the second ultrasonic sensor. This adjustment occurs in response to detection of an interfering ultrasonic signal during the listening window. An interfering ultrasonic signal is one of a frequency which could be misinterpreted as a returned ultrasonic signal of ultrasonic sensor 150-2. In some embodiments, the ultrasonic sensor is part of a device 100 and/or a sensor processing unit 120 of a device 100 and the adjustment at procedure 620 is directed by a processor such as host processor 110 or sensor processor 130.

In some embodiments, the adjustment may include listening for predetermined amount of time to determine a timing associated with the potentially interfering ultrasonic signal such as in 402 of flowchart 400 or similarly, and then based on the timing of the potentially interfering ultrasonic signal, adjusting the timing of future listening windows to track the potentially interfering ultrasonic signal. For example, this may comprise using a centering delay to time the start of the next sequential sensing cycle of ultrasonic sensor 150-2 such that a next interfering ultrasonic signal (of a series which appears to repeat on a static period) occurs within and/or near the center of the listening window of the next sensing cycle. See for example, FIG. 4 for an example of such an adjustment. The adjustment may also comprise shortening or lengthening a listening window of a next sensing cycle as described in 413 and 405 of flowchart 400, in an attempt to reacquire or track a recurring interfering ultrasonic signal such that it recurs in a listening window of a sensing cycle. In a similar fashion, this may comprise adjusting a sample rate of the ultrasonic sensor 150-2 up or down so that the next ultrasonic sensing cycle transmits its ultrasonic pulse at a prescribed time period after the detection of the potentially interfering ultrasonic signal. That is, a listening window may be truncated or have a delay added (as described above) in an attempt to place a recurrence of a potentially interfering signal in the next sensing cycle's listening window (rather than in its receive period) or in an attempt to track or find a potentially interfering ultrasonic signal. Such adjustment effectively adjusts the sample rate of the sensing by shortening or lengthening an overall sensing cycle 303.

In some embodiments, after listening for a period of time, it may be determined that a channel or frequency range used for ultrasonic sensing is full. In some embodiments, in response to this determination, the adjustment may comprise switching channels/altering the frequency used in the next sensing cycle. This may comprise, for example, listening for a predetermined period of time and counting interfering ultrasonic pulses. If the count exceeds a predetermined threshold, then a processor (e.g., 110, 130, or the like), may direct ultrasonic sensor 150-2 to change frequency/or channels either up or down by a specified increment. An example of this is described in 408, 409, and 410 of flowchart 400. In other embodiments, in response to the determination that the channel or frequency range is full, a processor (e.g., 110, 130, or the like), may direct ultrasonic sensor 150-2 to shorten its overall measurement rate to free up time between measurements on the frequency/channel. For example, this may comprise the processor (e.g., 110, 130, or the like), directing ultrasonic sensor 150-2 reduce its measurement rate such as by lengthening one or more of the ultrasonic sensor's transmit periods and/or the receive periods so time between measurements by ultrasonic sensor 150-2 is increased, thus giving other devices/sensors a greater amount of time to transmit and receive without interference.

In some embodiments, after an ultrasonic sensor has shifted its operating frequency or shortened its measurement rate, the ultrasonic sensor may periodically continue to measure for interference in the same manner described above. In response to interference either not being detected for a specified period (e.g., for a specified number of listening windows) or else being below a threshold for a specified period (e.g., for a specified number of listening windows), the ultrasonic sensor may revert back to a previous frequency or channel or revert a shortened measurement rate to its previous (un-shortened) rate. For example, this may comprise a processor (e.g., 110, 130, or the like), directing ultrasonic sensor 150-2 return to a previously used frequency and/or channel or to return its measurement rate to a measurement rate that was previously used before being shortened.

With continued reference to FIG. 6A, at procedure 630 of flow diagram 600, in various embodiments, ultrasonic sensor 150-2 proceeds with the emitting of the ultrasonic pulses and the receiving of the returned ultrasonic signals without the adjusting of operation in the absence of detection of any interfering ultrasonic signals for a predetermined time period. For example, and with reference to FIG. 4, this may comprise the ultrasonic sensor operating in loop of procedures 402, 403, 404, and 405 after fully incrementing the listening window to the target period length. In other embodiments, after sensing occurs for some predetermined period of time, such as 5 seconds 10 seconds, 30 seconds, etc.) sensing may occur without implementing any ultrasonic device coexistence modifications/adjustments to a sensing cycle. This may include continuing to sense with a current sensing cycle but not further adjusting any portion of it. This may also include returning back to a default sensing cycle used when no interference of other ultrasonic signals is detected. In some embodiments, listening windows are maintained and continue to be used to sense for interfering ultrasonic signals. In some embodiments, the ultrasonic sensor is part of a device 100 and/or a sensor processing unit 120 of a device 100 and the decision to proceed with out further adjustment at procedure 630 is made by and then carried out under direction of a processor such as host processor 110 or sensor processor 130.

With to FIG. 6B, at procedure 640 of flow diagram 600, in various embodiments the method as described in 610-630 further includes modulating an ultrasonic pulse of the emitted ultrasonic pulses to provide information from the ultrasonic sensor to the second ultrasonic sensor about a sensing protocol being used by the ultrasonic sensor. For example, in some embodiments, once an ultrasonic sensor has achieved a sensing cycle which facilitates ultrasonic coexistence, it may modulate its transmitted ultrasonic signal with information about the timing of transmission and receiving in its sensing cycle. Another ultrasonic sensor (e.g., ultrasonic sensor 150-1) or device (e.g., device 100-1) may receive and demodulate this information and then structure its sensing cycle in a manner that avoids a collision from a transmission from ultrasonic sensor 150-2 and/or avoids transmitting during a time that will likely be received during a receive period of ultrasonic sensor 150-2. Such adjustments by ultrasonic sensor 150-1 facilitate or further facilitate ultrasonic coexistence of devices operating in a shared operating environment, such as operating environment 200A or 200B. In some embodiments, the ultrasonic sensor is part of a device 100 and/or a sensor processing unit 120 of a device 100 and the decision to modulate a transmitted signal at procedure 640 is made by and then carried out under direction of a processor such as host processor 110 or sensor processor 130.

Conclusion

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims. Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed:
1. A device comprising:
an ultrasonic sensor configured to repeatedly emit ultrasonic pulses during transmit periods which are interspersed with receive periods, where returned ultrasonic signals corresponding to the emitted ultrasonic pulses are received by the ultrasonic sensor during the receive periods; and a processor communicatively coupled with the ultrasonic sensor, and configured to:

direct, by the processor, the ultrasonic sensor to listen during a listening window for a potentially interfering ultrasonic signal from a second ultrasonic sensor, wherein the listening window is prior to a transmit period of the transmit periods; and in response to detecting the potentially interfering ultrasonic signal during the listening window, the processor adjusts operation of the ultrasonic sensor to avoid an ultrasonic collision with the second ultrasonic sensor to facilitate coexistence of the ultrasonic sensor and the second ultrasonic sensor in an operating environment shared by the ultrasonic sensor and the second ultrasonic sensor.

2. The device of claim 1, wherein the processor is further configured to:

modulate an ultrasonic pulse of the emitted ultrasonic pulses to provide information from the ultrasonic sensor to the second ultrasonic sensor about a sensing protocol being used by the ultrasonic sensor.

3. The device of claim 1, wherein the responsive to detecting the potentially interfering ultrasonic signal during the listening window, the processor adjusts operation of the ultrasonic sensor to avoid an ultrasonic collision with the second ultrasonic sensor to facilitate coexistence of the ultrasonic sensor and the second ultrasonic sensor in an operating environment shared by the ultrasonic sensor and the second ultrasonic sensor comprises the processor being configured to:

listen for a predetermined amount of time to determine a timing associated with the potentially interfering ultrasonic signal; and based on the timing of the potentially interfering ultrasonic signal, adjust the timing of future listening windows to track the potentially interfering ultrasonic signal.

4. The device of claim 3, wherein the processor is further configured to:

in response to a number of the potentially interfering ultrasonic signals received during one of the future listening windows exceeding a predetermined threshold, change an operating frequency of the ultrasonic sensor to avoid signal collision and further facilitate coexistence of the ultrasonic sensor and the second ultrasonic sensor in the operating environment.

5. The device of claim 4, wherein the processor is further configured to:

in response to the number of the potentially interfering ultrasonic signals received during one of the future listening windows being below the predetermined threshold, revert to a previously used operating frequency of the ultrasonic sensor.

6. The device of claim 3, wherein the processor is further configured to:

in response to a number of the potentially interfering ultrasonic signals received during one of the future listening windows exceeding a predetermined threshold, reduce a measurement rate of the ultrasonic sensor by lengthening one or more of the transmit periods and the receive periods.

7. The device of claim 6, wherein the processor is further configured to:

in response to the number of the potentially interfering ultrasonic signals received during one of the future listening windows being below the predetermined threshold, revert to a previously used measurement rate of the ultrasonic sensor.

8. The device of claim 1, wherein the listening window is in addition to the receive periods used to listen for the returned ultrasonic signals.

9. The device of claim 1, wherein the adjustment by the processor of the operation of the ultrasonic sensor comprises:

a resumption of operation after no pulses of the potentially interfering ultrasonic signal are heard for a predetermined time period.

10. The device of claim 1, wherein the adjustment by the processor of the operation of the ultrasonic sensor comprises:

an adjustment of a sample rate of the ultrasonic sensor to emit an ultrasonic pulse of the ultrasonic pulses at a fixed time period after detecting the potentially interfering ultrasonic signal.

11. A sensor processing unit comprising:

an ultrasonic sensor configured to repeatedly emit ultrasonic pulses during transmit periods which are interspersed with receive periods, where returned signals corresponding to the emitted ultrasonic pulses are received by the ultrasonic sensor during the receive periods; and a sensor processor coupled with the ultrasonic sensor and configured to:

direct, by the sensor processor, the ultrasonic sensor to listen during a listening window for a potentially interfering ultrasonic signal from a second ultrasonic sensor, wherein the listening window is prior to a transmit period of the transmit periods; and responsive to detecting the potentially interfering ultrasonic signal during a listening window, the processor adjusts operation of the ultrasonic sensor to avoid an ultrasonic collision with the second ultrasonic sensor to facilitate coexistence of the ultrasonic sensor and the second ultrasonic sensor in an operating environment shared by the ultrasonic sensor and the second ultrasonic sensor.

12. The sensor processing unit of claim 11, wherein the sensor processor is further configured to:

modulate an ultrasonic pulse of the emitted ultrasonic pulses to provide information from the ultrasonic sensor to the second ultrasonic sensor about a sensing protocol being used by the ultrasonic sensor.

13. The sensor processing unit of claim 11, wherein the responsive to detecting the potentially interfering ultrasonic signal during a listening window, the processor adjusts operation of the ultrasonic sensor to avoid an ultrasonic collision with the second ultrasonic sensor to facilitate coexistence of the ultrasonic sensor and the second ultrasonic sensor in an operating environment shared by the ultrasonic sensor and the second ultrasonic sensor comprises the sensor processor being configured to:

listen for a predetermined amount of time to determine a timing associated with the potentially interfering ultrasonic signal; and based on the timing of the potentially interfering ultrasonic signal, adjust the timing of future listening windows to track the potentially interfering ultrasonic signal.

14. The sensor processing unit of claim 13, wherein the sensor processor is further configured to:

in response to a number of the potentially interfering ultrasonic signals received during one of the future listening windows exceeding a predetermined threshold, change an operating frequency of the ultrasonic sensor to avoid signal collision and further facilitate coexistence of the ultrasonic sensor and the second ultrasonic sensor in the operating environment.

15. The sensor processing unit of claim 11, wherein the listening window is in addition to the receive periods used to listen for the returned signals.

16. The sensor processing unit of claim 11, wherein the adjustment by the sensor processor of the operation of the ultrasonic sensor comprises:
   a resumption of operation after no pulses of potentially interfering ultrasonic signals are heard for a predetermined time period.

17. The sensor processing unit of claim 11, wherein the adjustment by the sensor processor of the operation of the ultrasonic sensor comprises:
   an adjustment of a sample rate of the ultrasonic sensor to emit an ultrasonic pulse of the ultrasonic pulses at a fixed time period after detecting the potentially interfering ultrasonic signal.

18. A method of operating an ultrasonic sensor to facilitate coexistence with other ultrasonic sensors in an operating environment of the ultrasonic sensor, the method comprising:
   listening, by the ultrasonic sensor, during a listening window for a potentially interfering ultrasonic signal from a second ultrasonic sensor, wherein the ultrasonic sensor is configured to repeatedly emit ultrasonic pulses during transmit periods which are interspersed with receive periods, where returned ultrasonic signals corresponding to the emitted ultrasonic pulses are received by the ultrasonic sensor during the receive periods, and wherein the listening window is prior to a transmit period of the transmit periods;
   responsive to detecting an interfering ultrasonic signal during the listening window, adjusting operation of the ultrasonic sensor to avoid an ultrasonic collision with the second ultrasonic sensor to facilitate coexistence of the ultrasonic sensor and the second ultrasonic sensor in an operating environment shared by the ultrasonic sensor and the second ultrasonic sensor; and
   responsive to an absence of detection of any interfering ultrasonic signals for a predetermined time period, proceeding with the emitting of the ultrasonic pulses and the receiving of the returned ultrasonic signals without the adjusting of operation.

19. The method as recited in claim 18, further comprising:
   modulating an ultrasonic pulse of the emitted ultrasonic pulses to provide information from the ultrasonic sensor to the second ultrasonic sensor about a sensing protocol being used by the ultrasonic sensor.

20. The method as recited in claim 18, wherein the listening, by the ultrasonic sensor, during a listening window for a potentially interfering ultrasonic signal from a second ultrasonic sensor comprises:
   listening, by ultrasonic sensor, during a listening window for a potentially interfering ultrasonic signal from a second ultrasonic sensor, wherein the listening window is in addition to the receive periods used to listen for the returned ultrasonic signals.

21. The method as recited in claim 18, wherein the adjusting operation of the ultrasonic sensor to avoid an ultrasonic collision with the second ultrasonic sensor to facilitate coexistence of the ultrasonic sensor and the second ultrasonic sensor in an operating environment shared by the ultrasonic sensor and the second ultrasonic sensor comprises:
   listening for a predetermined amount of time to determine a timing associated with the potentially interfering ultrasonic signal; and
   based on the timing of the potentially interfering ultrasonic signal, adjusting the timing of future listening windows to track the potentially interfering ultrasonic signal.

22. The method as recited in claim 21, further comprising:
   in response to a number of the potentially interfering ultrasonic signals received during one of the future listening windows exceeding a predetermined threshold, changing an operating frequency of the ultrasonic sensor to avoid signal collision and further facilitate coexistence of the ultrasonic sensor and the second ultrasonic sensor in the operating environment.

23. The method as recited in claim 18, wherein the adjusting operation of the ultrasonic sensor to avoid an ultrasonic collision with the second ultrasonic sensor to facilitate coexistence of the ultrasonic sensor and the second ultrasonic sensor in an operating environment shared by the ultrasonic sensor and the second ultrasonic sensor comprises:
   adjusting a sample rate of the ultrasonic sensor to emit an ultrasonic pulse of the ultrasonic pulses at a fixed time period after detecting the potentially interfering ultrasonic signal.

* * * * *